US007010301B2

(12) United States Patent
Foster et al.

(10) Patent No.: US 7,010,301 B2
(45) Date of Patent: *Mar. 7, 2006

(54) APPARATUS, METHOD AND SYSTEM FOR MOBILE WIRELESS COMMUNICATION HAND-OFF UTILIZING ISDN MULTIWAY CAPABILITIES

(75) Inventors: Eugene William Foster, Naperville, IL (US); Kimberly Sue Tomasko-Dean, LaGrange, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 687 days.

This patent is subject to a terminal disclaimer.

(21) Appl. No.: 09/895,591

(22) Filed: Jun. 28, 2001

(65) Prior Publication Data

US 2003/0003916 A1    Jan. 2, 2003

(51) Int. Cl.
*H04Q 7/20* (2006.01)

(52) U.S. Cl. .............. 455/442; 455/436; 455/428; 370/331

(58) Field of Classification Search ........... 455/442, 455/436, 439, 450, 428; 370/331, 332, 333, 370/328
See application file for complete search history.

(56) References Cited

U.S. PATENT DOCUMENTS

| | | | |
|---|---|---|---|
| 4,829,554 A | 5/1989 | Barnes et al. | |
| 5,590,172 A | 12/1996 | Lodwig et al. | |
| 5,828,659 A * | 10/1998 | Teder et al. | ........... 370/328 |
| 5,909,487 A | 6/1999 | Mainker | |
| 5,940,758 A | 8/1999 | Chavez, Jr. et al. | |
| 5,940,763 A * | 8/1999 | Alperovich et al. | ........ 455/450 |
| 6,009,326 A | 12/1999 | Roder et al. | |
| 6,263,203 B1 | 7/2001 | Jahn | |
| 6,374,102 B1 * | 4/2002 | Brachman et al. | ....... 455/422.1 |
| 6,501,952 B1 | 12/2002 | Foster et al. | |
| 6,662,011 B1 * | 12/2003 | Sale et al. | ............. 455/428 |
| 6,690,938 B1 * | 2/2004 | Chin | .................. 455/450 |
| 6,799,040 B1 * | 9/2004 | Foster et al. | ............. 455/436 |
| 6,801,773 B1 * | 10/2004 | Foster et al. | ............. 455/436 |
| 2001/0012335 A1 | 8/2001 | Kaufman et al. | |
| 2003/0003911 A1 | 1/2003 | Foster et al. | |
| 2003/0003915 A1 | 1/2003 | Foster et al. | |

* cited by examiner

*Primary Examiner*—Charles Appiah
*Assistant Examiner*—Nghi H. Ly (57) ABSTRACT

An apparatus, method and system are provided for hand-off of a communication session utilizing ISDN multiway capabilities, in which the communication session of a mobile unit on a first call path is transferred from a serving base station to a target base station. The preferred system includes a switch coupled to a serving base station and a target base station, wherein the serving base station includes instructions to request a second call path to the target base station and to request a multiway feature. The switch then establishes the second call path from the serving base station to the target base station via the switch, and combines the communication session of the first call path with the second call path to form a multiway communication session. The mobile unit then communicates with the target base station for continuation of the communication session through a first leg of the multiway communication session, and the serving base station is released from a second leg of the multiway communication session, completing the hand-off.

37 Claims, 5 Drawing Sheets

APPARATUS, METHOD AND SYSTEM FOR MOBILE WIRELESS COMMUNICATION HAND-OFF UTILIZING ISDN MULTIWAY CAPABILITIES

FIELD OF THE INVENTION

The present invention relates, in general, to wireless communication systems, and more particularly, to an apparatus, method and system for mobile wireless communication hand-off utilizing ISDN multiway capabilities.

BACKGROUND OF THE INVENTION

Mobile wireless communication systems typically employ many base stations (such as cell sites) to provide wireless communication throughout a given geographic region. As a mobile unit (or mobile station) may traverse the geographic region, the communication to and from the mobile unit may occur through one or more of these base stations. To maintain an ongoing communication session during such transitions between base stations, various hand-off methods have evolved to transfer the wireless communication with the mobile unit from one base station to another base station, while maintaining such an ongoing call or session.

In the prior art, for some of the various methods utilized during such hand-offs, the communication session may suffer from some degree of interruption, which may be noticeable to the consumer of wireless communication services. As a consequence, a need remains to provide for comparatively seamless hand-offs, which do not interrupt ongoing communication sessions and which are imperceptible to the consumer.

In addition, while other prior art systems may provide comparatively seamless hand-offs, such hand-offs typically utilize considerable network resources. In an Autoplex® system, for example, in addition to switches and base stations, another network entity referred to as an Executive Call Processor ("ECP") selects a server at the new cell site, while another network entity referred to as a Call Processing Database Node ("CDN") transmits various data link messages to the current and new cell sites, adding an additional path to the existing call, directing the new cell site to activate a wireless voice link, and directing the current (serving) cell site to direct the mobile to retune to the new wireless voice link at the new cell site.

As a consequence, a need remains for a wireless communication system to provide comparatively seamless and imperceptible hand-offs. In addition, such a wireless communication system should be reasonably efficient and capable of cost-effective implementation, eliminating or minimizing the use of additional network resources.

SUMMARY OF THE INVENTION

The wireless communication system of the present invention provides virtually seamless and imperceptible hand-offs of communication sessions of mobile units. The various embodiments of the present invention are reasonably efficient and capable of cost-effective implementation in existing communication equipment such as switches and base stations. Moreover, the various embodiments of the present invention eliminate or minimize the use of additional network resources such as ECPs and CDNs, while being compatible with other intelligent network devices and systems.

In accordance with the present invention, an apparatus, method and system are provided for hand-off of a communication session utilizing a multiway connection, in which the communication session of a mobile unit is transferred from a serving base station to a target base station. The preferred system includes a switch coupled to a serving base station and a target base station, preferably over digital lines having multiple, independent channels, such as Integrated Services ("ISDN") lines having two 64 Kbps "B" channels and one 16 Kbps "D" channel for a Basic Rate Interface ("BRI"). Typically, each of the various base stations include a plurality of terminals which handle and process the communication sessions with mobile units and, in general, one or more terminals are assigned directory numbers ("DNs"). Each terminal within a base station in the preferred system is assigned two B channels for voice service, with multiway capabilities, and a "D" channel for signaling in an ISDN BRI implementation. In general, the communication session (to be handed off) is occurring on one of the channels, such as on a first B channel. When a hand-off of the communication session is indicated, the serving base station generates on the second, heretofore unused B channel, a separate, second call path to the target base station via the switch. The serving base station then initiates a conference (or other multiway) request to the switch to merge or conference the existing communication session in the first channel with the call path on the second channel. The mobile unit is then directed to tune to, or otherwise communicate with the target base station for connection to the communication session on the second call path. The serving base station then disconnects its call path legs from the communication session, leaving the communication session up between the mobile user, the target base station and the switch.

As a consequence, the communication session of the mobile unit has been handed off, seamlessly and without interruption, from the serving base station to the target base station. Such a hand-off has also occurred utilizing minimal network resources, the switch and the base stations, without involvement of other intelligent or supervisory network elements.

The multiway (or conference) call path from the serving base station to the switch is established through the transmission of various messages between the serving base station and the switch. The switch is correspondingly configured to acknowledge and connect the first and second call paths to create a multiway call path with the target base station, upon receipt of these various messages. As discussed in greater detail below, these various messages may be combined in a variety of ways.

Numerous other advantages and features of the present invention will become readily apparent from the following detailed description of the invention and the embodiments thereof, from the claims and from the accompanying drawings.

DETAILED DESCRIPTION OF THE INVENTION

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

As mentioned above, a need remains for a wireless communication system to provide comparatively seamless and imperceptible hand-offs, which is reasonably efficient and capable of cost-effective implementation, and which eliminates or minimizes the use of additional network resources such as ECPs and CDNs. In accordance with the present invention, a system, apparatus and method are illustrated which provide such advantages, namely, providing relatively seamless and imperceptible wireless hand-offs while utilizing minimal network resources (namely, utilizing existing switches and base stations configured in accordance with the invention), while simultaneously eliminating the prior art utilization of other network elements such as ECPs and CDNs.

Figure 1:
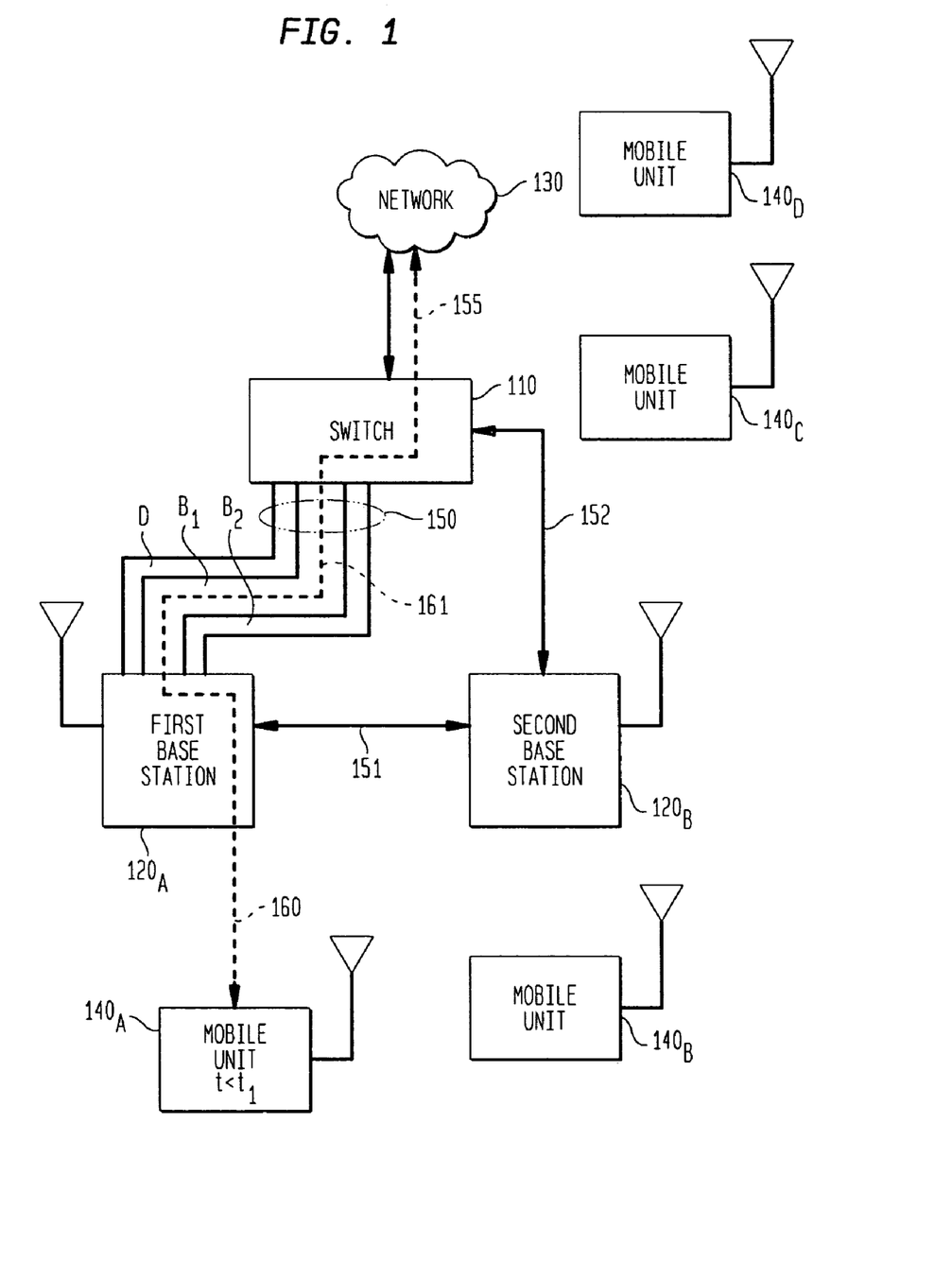
FIG. 1 is a block diagram illustrating a system embodiment, with a first communication path illustrated from a first base station to a mobile unit prior to a hand-off, in accordance with the present invention.

FIG. 1 is a block diagram illustrating such a system embodiment 100 in accordance with the present invention. As illustrated in FIG. 1, the system 100 includes a switch 110 and one or more base stations (equivalently, cell sites) 120, such as first base station $120_A$ and second base station $120_B$. The switch 110 is preferably a telecommunication switch such as a 5 ESS® switch manufactured by Lucent Technologies, Inc. which has been configured to operate in accordance with the present invention, as discussed in greater detail below. The switch is coupled to a network 130, for additional call routing. The switch 110 may also be included within a mobile switching center, and may also be coupled to other intelligent network devices (not illustrated). The base stations 120 include wireless transceivers, for wireless communication with various mobile units (equivalently, mobile stations) 140, such as cellular or other wireless telephones, wireless modems, or other wireless communication devices. The switch 110 and base stations 120 are coupled to each other utilizing signaling and/or trunking lines 150, 151 and 152 as known in the art. In the preferred embodiment, the switch 110 is connected to the various base stations 120 (via signaling and/or trunking lines 150 and 152) using Basic Rate Interface "BRI" lines of an Integrated Services Digital Network ("ISDN"), with each of the base stations 120 having a plurality of (preferably independent) "B" channels for voice services and multiway capabilities and a "D" channel for signaling and other messaging. The base stations 120 include a plurality of terminals (not separately illustrated) having one or more assigned directory numbers.

As any mobile unit 140 traverses a geographic region and becomes farther away from any given base station 120 with which it has been in communication, the signal or power levels of such wireless communication to and from the mobile unit 140 typically drop below a preferred threshold or range. Under these circumstances, it is preferable for the given base station 120 to hand-off the communication to another base station 120 having higher signal strength to and from the given mobile unit 140. Continuing to refer to FIG. 1, for example, the mobile unit $140_A$ having a communication session (at a time $t<t_1$) is currently served by first base station $120_A$, illustrated as communication or call path legs 160 (wireless) and 161 (wireline) using a first B channel ($B_1$). The portion of the communication session between the switch 110 and the network 130 is separately illustrated as call path 155. In these circumstances, the first base station $120_A$ is generally referred to as a serving base station or serving cell site. As the mobile unit $140_A$ travels toward the vicinity of mobile unit $140_C$, it may become necessary or preferable for the first, serving base station $120_A$ to hand-off the communication session of mobile unit $140_A$ to the second base station $120_B$. In these circumstances, the second base station $120_B$ is generally referred to as a target base station or target cell site. Such a hand-off, in accordance with the present invention, is illustrated below with respect to FIGS. 2 and 3.

Figure 2:
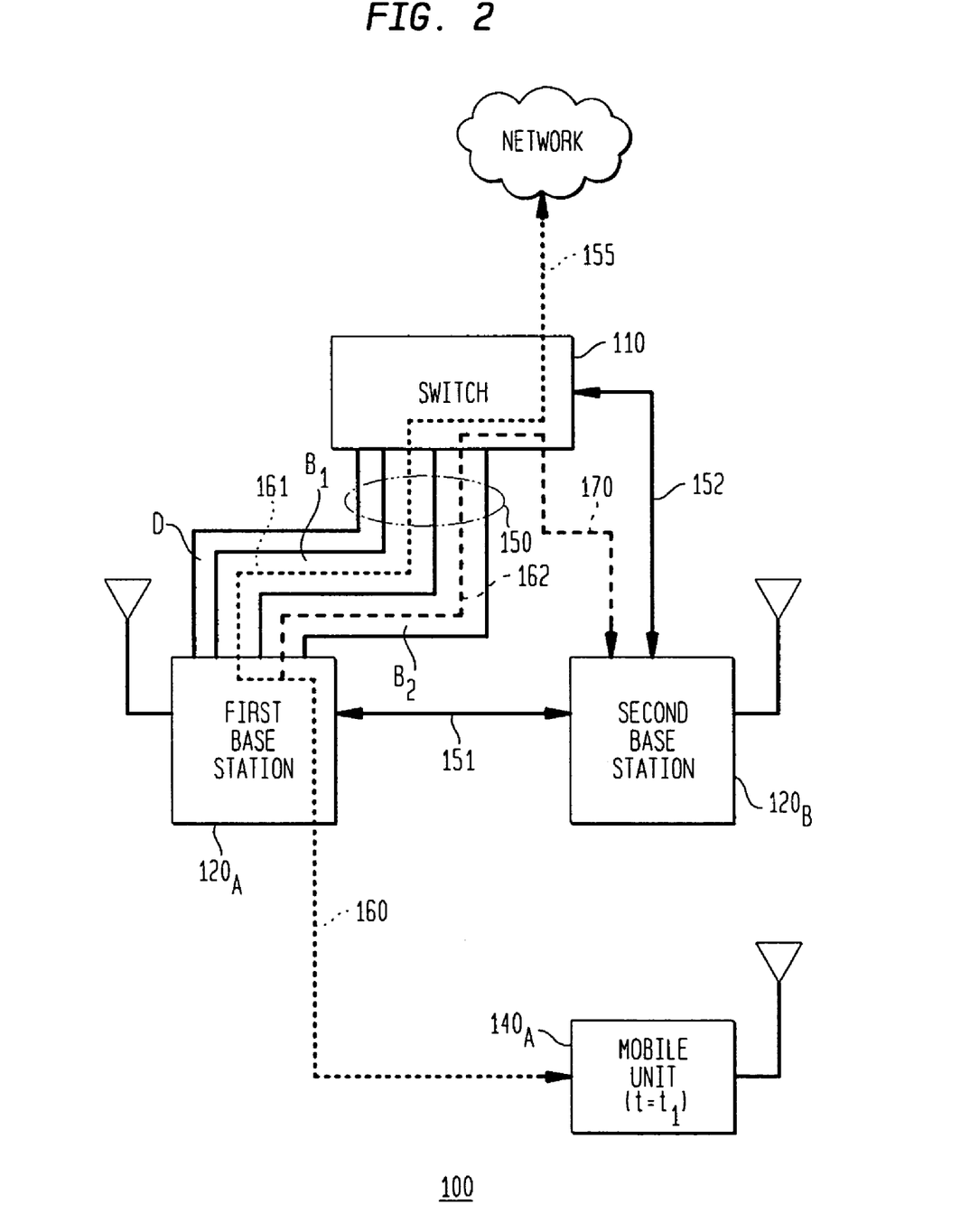
FIG. 2 is a block diagram illustrating a system embodiment, with the first communication path illustrated from the first base station to the mobile unit and a second communication path from the first base station to the target base station, illustrated during a hand-off, in accordance with the present invention.

FIG. 2 is a block diagram illustrating a system embodiment, with the first call (or communication path) illustrated from the switch 110 and first base station $120_A$ to the mobile unit $140_A$ (call path 161 on channel $B_1$ and call path 160, respectively) and a second call (or communication) path illustrated from the first base station $120_A$, via switch 110, to the second base station $120_B$ (call paths 162 and 170). In accordance with the present invention, and as explained in greater detail below, the serving base station $120_A$ creates the second call path using an available second B channel ($B_2$), to the target base station $120_B$ via switch 110, illustrated as call paths or legs 162 and 170. Serving base station $120_A$ then transmits a multiway (or other conference) request to switch 110, to conference or merge the first call path and the second call path on the two independent channels ($B_1$ and $B_2$), establishing a multiway connection among the mobile unit $140_A$, the serving base station $120_A$ and the target base station $120_B$. As discussed in greater detail below, in the preferred embodiment, this is accomplished through various call set up messages and the multiway capabilities of ISDN. The completion of the hand-off then proceeds as illustrated below with reference to FIG. 3.

Figure 3:
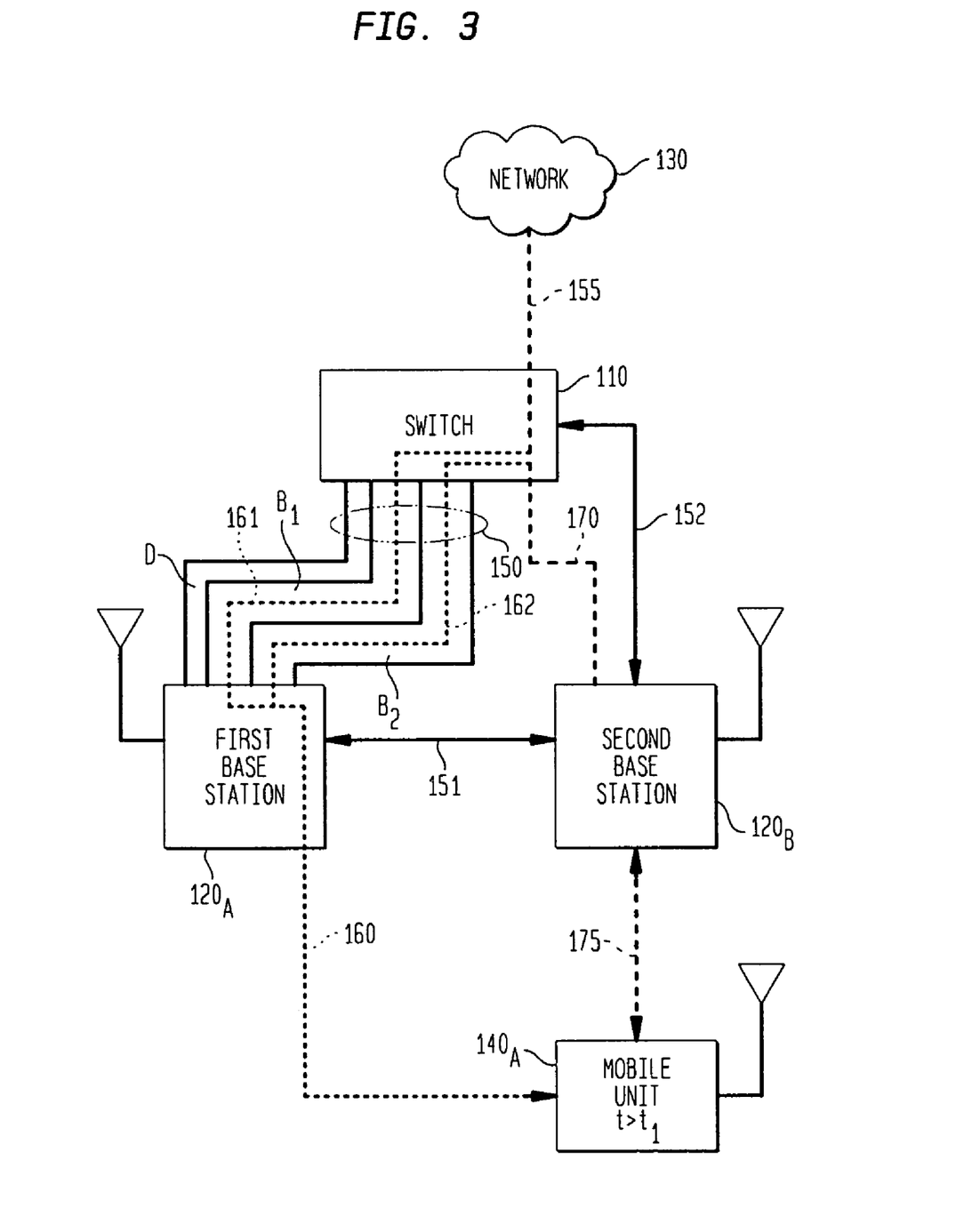
FIG. 3 is a block diagram illustrating a system embodiment, with the second communication path illustrated during completion of a hand-off and the commencement of a tear down of the first communication path, in accordance with the present invention.

FIG. 3 is a block diagram illustrating a system embodiment, with the second communication path illustrated during completion of a hand-off and the commencement of a tear down of the first communication path, in accordance with the present invention. When the multiway (conference) call path (combined call legs 161, 162 and 170) has been established, (i.e., when the first and second call paths have been merged at the switch 110), in accordance with the present invention, the mobile unit $140_A$ then tunes to a specified channel of or otherwise sets up a communication path to the base station $120_B$, illustrated as call path (or leg) 175, for continuing the same communication session via a portion of the multiway call path, namely, call path (or leg) 170. The hand-off of the communication session from the serving base station to the target base station is then complete, and the communication path legs 160, 161 and 162 may then be torn down, with the communication session continuing uninterrupted through call paths (legs) 175, 170, and 155, as illustrated in FIG. 3.

As may be apparent from the above discussion, the hand-off of the communication session, from the first, serving base station $120_A$ to the second, target base station $120_B$, utilizing multiway capabilities (e.g., of ISDN), occurs seamlessly and without interruption. In addition, such a hand-off is accomplished without the need for additional network resources.

Figure 4:
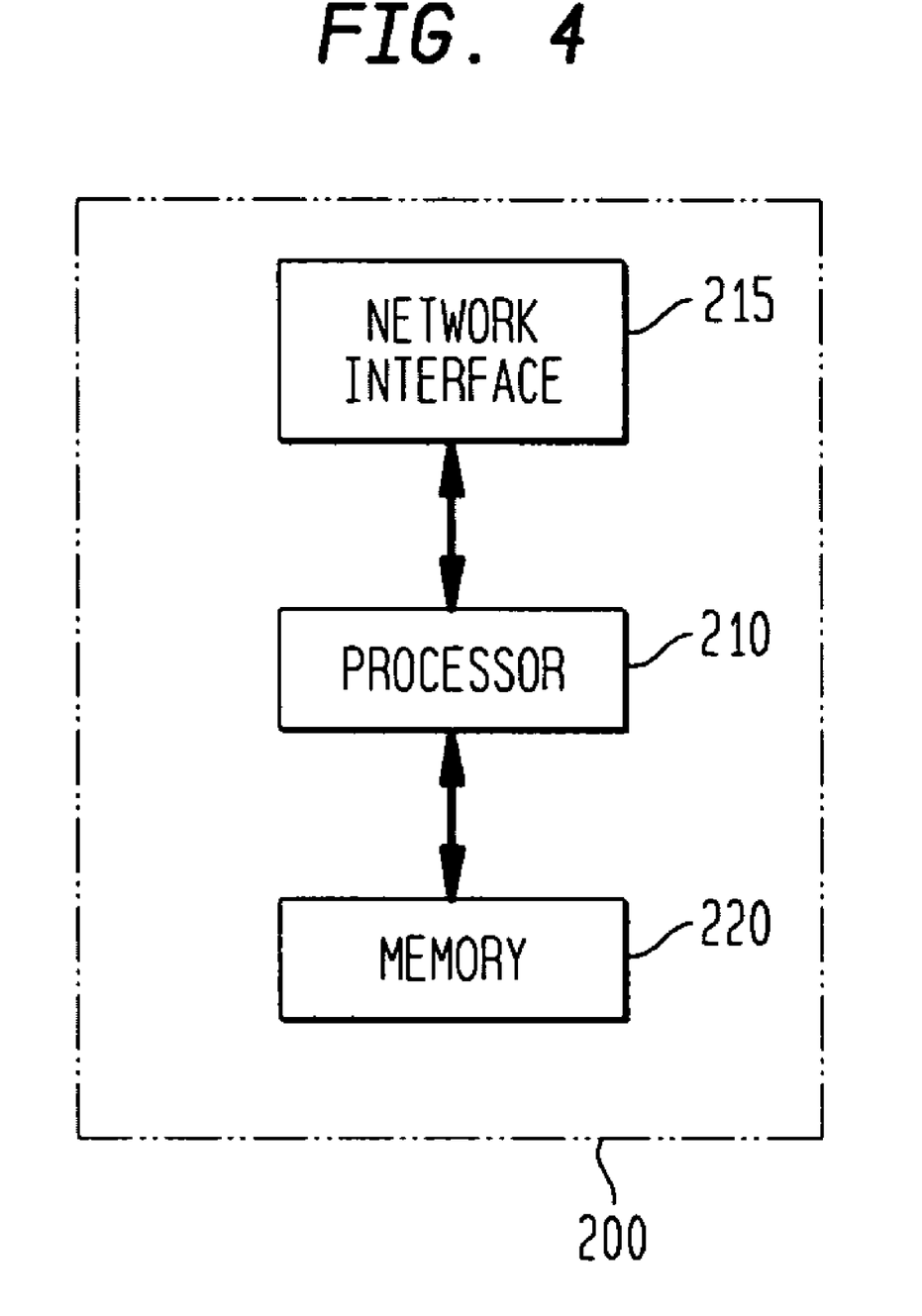
FIG. 4 is a block diagram illustrating an apparatus embodiment in accordance with the present invention.

FIG. 4 is a block diagram illustrating an apparatus embodiment 200 in accordance with the present invention. As discussed in greater detail below, such an apparatus 200 may be included within, or distributed between, a switch 110 and/or a base station 120 of a system 100. (Numerous other variations and equivalent embodiments will be readily apparent and are also within the scope of the present invention). The apparatus 200 includes a processor 210, a network interface 215, and a memory 220. The network interface 215 is utilized to receive and to transmit the various communication links (legs or paths), and also to receive and transmit messages or other signaling, such as to transmit multiway (conference) requests, when the apparatus 200 is embodied within a base station 120; or to receive multiway (conference) requests, when the apparatus 200 is embodied within a switch 110. The network interface 215 is also utilized for transmission and reception of various requests and responses discussed below, such as call set up messages and information messages. The memory 220 may be a magnetic hard drive, an optical storage device, RAM, FLASH, or any other type of memory, data storage apparatus or circuit. The memory 220 is used to store information pertaining to call placement, call set up, routing information, and configuration or program instructions, as discussed in greater detail below.

Continuing to refer to FIG. 4, the processor 210 may include a single integrated circuit ("IC"), or may include a plurality of integrated circuits or other components connected, arranged or grouped together, such as microprocessors, digital signal processors ("DSPs"), custom ICs, application specific integrated circuits ("ASICs"), field programmable gate arrays ("FPGAs"), associated memory (such as RAM and ROM), and other ICs and components. As a consequence, as used herein, the term processor should be understood to equivalently mean and include a single IC, or arrangement of custom ICs, ASICs, processors, microprocessors, controllers, FPGAs, or some other grouping of integrated circuits which perform the functions discussed above with reference to FIGS. 1–3, and also discussed below with reference to FIG. 5, with associated memory, such as microprocessor memory or additional RAM, DRAM, SRAM, MRAM, ROM, EPROM or E$^2$PROM. The processor 210 with its associated memory may be configured (via programming, FPGA interconnection, or hard-wiring) to perform the methodology of the invention, as discussed above with reference to FIGS. 1–3 and as discussed below with reference to FIG. 5. For example, the methodology may be programmed and stored, in the processor 210 with its associated memory (and/or memory 220) and other equivalent components, as a set of program instructions (or equivalent configuration or other program) for subsequent execution when the processor 210 is operative (i.e., powered on and functioning). Equivalently, when the processor 210 with its associated memory and other equivalent components are implemented in whole or part as FPGAs, custom ICs and/or ASICs, the FPGAs, custom ICs or ASICs also may be designed, configured and/or hard-wired to implement the methodology of the invention. In the preferred embodiment, the processor 210 is implemented in its entirety as a microprocessor, which is programmed to implement the methodology of the invention.

Figure 5:
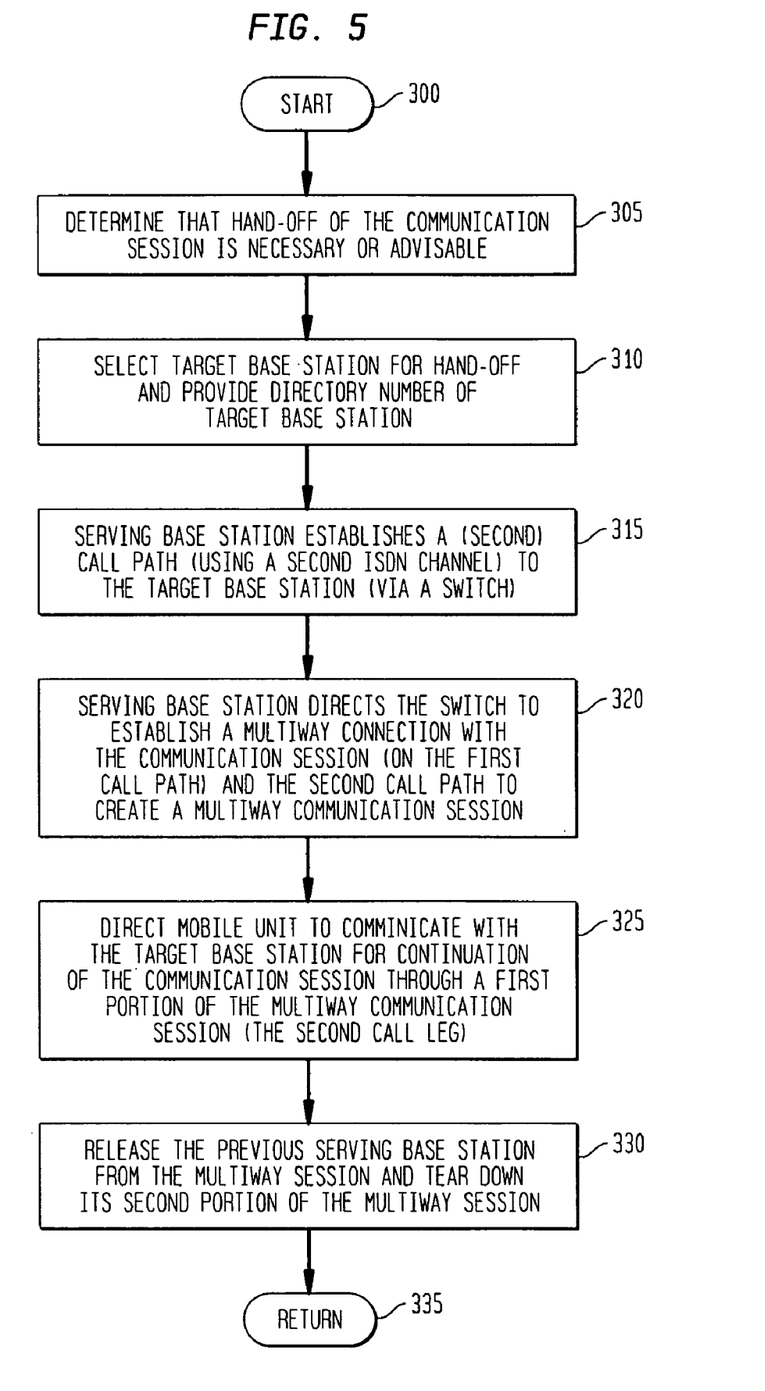
FIG. 5 is a flow diagram illustrating a method embodiment in accordance with the present invention.

FIG. 5 is a flow diagram illustrating a method embodiment in accordance with the present invention. Beginning with start step 300, the method determines that a hand-off is necessary or preferable, step 305. This may be accomplished through various methods known in the art, from various requests transmitted by the serving base stations, such as base station 120$_A$, with responses from the potential target base stations, such as base station 120$_B$, or by determinations made by the particular mobile unit 140. Next, a target base station is selected for a hand-off, also as known in the art, step 310, such as second base station 120$_B$. Following or as part of this selection process in step 310, in the preferred embodiment of the invention, there is an exchange of information (via signaling path 151 in FIG. 1) between the serving base station and the target base station, including a designation of a directory number ("DN") of a terminal of the selected target base station for use in establishing the second call path for the upcoming hand-off. The serving base station then initiates a second call path (on a second ISDN B channel) to the selected target base station (using the selected DN of the target base station), via a switch, step 315. In step 320, the serving base station directs the switch to establish a multiway (conference) connection between the first call path having the communication session (on the first channel B$_1$) and the second call path (on the second channel B$_2$), thereby creating a multiway communication session.

In the preferred embodiment, steps 315 and 320 may be accomplished in a variety of ways. In the preferred embodiment, the switch has been configured (populated) with an indicator that particular directory numbers (DNs) associated with the terminals of the various base stations have call features allowing multiway or other conferencing features. To commence the hand-off by creating the second call path, the serving base station 120 transmits a SETUP message to the switch 110 for a new call, and receives a corresponding acknowledgement from the switch 110. The call is preferably established on a second channel (B$_2$) available to the serving base station, with the second channel B2 preferably designated in a channel identification field of the SETUP message. The serving base station then transmits one or more information ("INFORMATION") messages to the switch 110, preferably information messages on a separate (signaling) channel, which are compatible with ISDN Q.931 standards. In the preferred embodiment, a first information message (or equivalently, a first sequence of information messages) from the serving base station to the switch are utilized, in which the first information message (or sequence of information messages) designates the selected DN (previously communicated) of a terminal at the target base station for the hand-off, with the DN preferably encoded in a keypad field of the information message. The switch (utilizing appropriate ISDN Q.931 compatible messages such as SETUP, ALERTING, and CONNECT) then establishes the second call path in the second channel (B$_2$) between the serving base station and the target base station.

In the preferred embodiment, following establishment of the second call path (in step 315), for step 320, the serving base station then requests that the switch 110 place the second call path "on hold" (using a HOLD message for B$_2$ and receiving a corresponding HOLD ACK from the switch). The serving base station then transmits a second information message to the switch directing the switch to invoke a multiway (conference) feature on the communication session of the first call path (on the first channel B$_1$) (i.e., creating a multiway session between the communication session of the first call path (on the first channel B$_1$) with the second call path (on the second channel B$_2$)). In the preferred embodiment, the second information message (INFO) includes a conference or multiway request in a feature activation field, and further designates channel $B_1$, and in response, receives an information message (INFO) from the switch which includes a conference or multiway request in a feature indication field, and further also designates channel $B_1$. Using a "RETRIEVE" message to the switch designating channel $B_2$, with a corresponding acknowledgement from the switch, the serving base station requests the switch to take the second call path on the second channel $B_2$ off "hold", effectively merging the communication session of the first call path on the first channel $B_1$ with the second call path on the second channel $B_2$, establish the multiway links (or multiway session). It should be noted that throughout this procedure, the communication session of the first call path has not been interrupted or interfered with in any way.

Alternatively, the multiway or conference feature could be activated by transmitting a feature activation element, denoting a multiway or conference connection as part of the initial SETUP message, eliminating the second information message. As another alternative, the conference or multiway feature activation element may be included within a field of the first sequence of information messages which also contain the target base station terminal's directory number as a keypad element.

Following the creation of the multiway communication session in steps 315 and 320, in accordance with the present invention, in step 325 the mobile unit $140_A$ tunes to a specified channel of or otherwise sets up a communication path to the target base station $120_B$ for continuation of the communication session through the conferenced leg (call path 170) of the multiway session, i.e., through a first portion or first leg of the multiway session. This communication path from the mobile unit to the target base station is illustrated in FIG. 3 as call path 175.

In the preferred embodiment, a variety of methods may be utilized to provide for the establishment of call path 175; for example, the mobile unit $140_A$ may be directed by the serving base station to communicate with (or tune to a channel of) the target base station, or the mobile unit $140_A$ may initiate such a communication with or tuning to the target base station. As the various target and serving base stations have independent signaling paths (illustrated generally as a signaling and/or trunking line 151 in FIG. 1), the target base station then generally notifies the serving base station that the serving base station may now drop (tear down) its (second) portion or second leg of the multiway session (the portion of call paths 161 and 162, between the switch 110 and the first base station $120_A$). As a consequence, in step 330, the previously serving base station ($120_A$) disconnects from the multiway session, and the switch 110 releases the call to this previously serving base station, thereby tearing down the communication paths or legs 161, 162 and 160 (from the switch 110 to the first base station $120_A$ and mobile unit $140_A$), with the communication session continuing uninterrupted through links or call paths 155, 170 and 175 as illustrated in FIG. 3. Step 330 is preferably accomplished by the transmission of a "DISCONNECT" message from the previously serving base station $120_A$ to the switch 110, followed by a release message transmitted from the switch 110 to the base station $120_A$, followed by a release complete message transmitted from the previously serving base station $120_A$ to the switch 110. Following the release of step 330, the method may end, return step 335.

Numerous advantages of the present invention may be apparent from the above discussion. First, as illustrated above, the wireless communication system of the present invention provides virtually seamless and imperceptible hand-offs of communication sessions of mobile units. Second, the various embodiments of the present invention are reasonably efficient and capable of cost-effective implementation in existing communication equipment such as switches and base stations. Moreover, the various embodiments of the present invention eliminate or minimize the use of additional network resources such as ECPs and CDNs, while being compatible with other intelligent network devices and systems.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

What is claimed is:

1. A method for hand-off of a communication session in a mobile wireless communication system, in which the communication session of a mobile unit on a first call path is transferred from a serving base station to a target base station, the method comprising:
   (a) establishing a second call path from the serving base station to the target base station via a switch;
   (b) combining the second call path with the communication session on the first call path to form a multiway communication session;
   (c) providing for the mobile unit to communicate with the target base station for continuation of the communication session through a first leg of the multiway communication session; and
   (d) releasing the serving base station from a second leg of the multiway communication session.

2. The method of claim 1, wherein step (a) further comprises:
   transmitting a call set up message to the switch;
   transmitting a first information message to the switch specifying a directory number of a terminal of the target base station.

3. The method of claim 2, wherein step (b) further comprises:
   transmitting a second information message to the switch to request a multiway communication session joining the communication session on the first call path with the second call path.

4. The method of claim 3, wherein the call set up message, the first information message and the second information message have a format compatible with an ISDN Q.931 standard.

5. The method of claim 1, wherein step (a) further comprises:
   transmitting a call set up message to the switch, the call set up message including a designation of a conference feature.

6. The method of claim 1, wherein step (b) further comprises:
   transmitting one or more information messages to the switch designating a directory number of a terminal of the target base station in a first field and designating a conference feature in a second field.

7. The method of claim 1, wherein step (a) further comprises:
   transmitting a call setup message from the switch to the target base station; and transmitting a plurality of connect messages from the switch to the target base station and to the serving base station.

8. The method of claim 1, wherein the multiway communication session is established between and among the serving base station, the switch and the target base station.

9. The method of claim 1, where step (d) further comprises:
transmitting a disconnect message from the serving base station to the switch; and
transmitting a release message from the switch to the serving base station.

10. The method of claim 1, wherein the first call path utilizes a first communication channel and the second call path utilizes a second communication channel.

11. A system for hand-off of a communication session utilizing multiway capabilities, in which the communication session of a mobile unit on a first call path is transferred from a serving base station to a target base station, the system comprising:
a plurality of base stations, the plurality of base stations including the serving base station and the target base station, wherein the serving base station includes instructions to request a second call path to the target base station and to request a multiway feature; and
a switch coupled to the serving base station and to the target base station, wherein the switch includes instructions to establish the second call path from the serving base station to the target base station via the switch, and to combine the communication session of the first call path with the second call path to form a multiway communication session; and when the mobile unit has communicated with the target base station for continuation of the communication session through a first leg of the multiway communication session; the switch includes further instructions to release the serving base station from a second leg of the multiway communication session.

12. The system of claim 11, wherein the serving base station includes further instructions to transmit a call set up message to the switch and to transmit a first information message to the switch specifying a designated directory number of a terminal of the target base station.

13. The system of claim 12, wherein the first information message includes a multiway request specified as a feature activation element.

14. The system of claim 12, wherein the serving base station includes further instructions to transmit a second information message to the switch to request a multiway communication session joining the communication session on the first call path with the second call path.

15. The system of claim 14, wherein the call setup message, the first information message and the second information message have a format compatible with an ISDN Q.931 standard.

16. The system of claim 11, wherein the serving base station includes further instructions to transmit a call set up message to the switch, the call set up message including a designation of a conference feature.

17. The system of claim 11, wherein the serving base station includes further instructions to transmit one or more information messages to the switch designating a directory number of a terminal of the target base station in a first field and designating a conference feature in a second field.

18. The system of claim 11, wherein the multiway communication session is established between and among the serving base station, the switch and the target base station.

19. The system of claim 11, wherein the serving base station includes further instructions to transmit a disconnect message to the switch, and wherein the switch includes further instructions to transmit a release message from the switch to the serving base station.

20. The system of claim 11, wherein the first call path utilizes a first Integrated Services Digital Network (ISDN) communication channel and the second call path utilizes a second ISDN communication channel.

21. An apparatus for hand-off of a communication session, in which the communication session of a mobile unit on a first call path is transferred from a serving base station to a target base station via a switch, the apparatus comprising:
a network interface for communication with the switch and with the mobile unit;
a memory storing instructions; and
a processor coupled to the memory and to the network interface, wherein the processor is configured to request a second call path to the target base station via the switch, and to direct the switch to merge the first call path and the second call path to form a multiway communication session, and wherein the processor is further configured to release from a first segment of the multiway communication session for continuation of the communication session through a second segment of the multiway communication session.

22. The apparatus of claim 21, wherein the processor is further configured to transmit to the switch, through the network interface, a call set up message and a first information message specifying a directory number of a terminal of the target base station.

23. The apparatus of claim 22, wherein the processor is further configured to transmit to the switch, through the network interface, a second information message requesting multiway communication session joining the communication session on the first call path with the second call path.

24. The apparatus of claim 23, wherein the call set up message, the first information message and the second information message have a format compatible with an ISDN Q.931 standard.

25. The apparatus of claim 21, wherein the processor is further configured to transmit through the network interface a call set up message to the switch, the call set up message including a designation of a conference feature.

26. The apparatus of claim 21, wherein the processor is further configured to transmit through the network interface an information messages to the switch designating a directory number of a terminal of the target base station in a first field and designating a conference feature in a second field.

27. The apparatus of claim 21, wherein the multiway communication session is established between and among the serving base station, the switch, and the target base station.

28. The apparatus of claim 21, wherein the apparatus is included with the serving base station.

29. An apparatus for hand-off of a communication session, in which the communication session of a mobile unit on a first call path is transferred from a serving base station to a target base station, the apparatus comprising:
a network interface for communication with the serving base station and the target base station;
a memory storing instructions; and
a processor coupled to the memory and to the network interface, wherein the processor is configured, upon reception of a message from the serving base station, to generate a second call path between the serving base station and the target base station, and to merge the first call path and the second call path to form a multiway communication session for continuation of the communication session through a first segment of the multiway communication session.

30. The apparatus of claim 29, wherein the processor is further configured to receive from the serving base station, through the network interface, a call set up message and a first information message specifying a directory number of a terminal of the target base station.

31. The apparatus of claim 30, wherein the processor is further configured to receive from the serving base station, through the network interface, a second information message requesting multiway communication session joining the communication session on the first call path with the second call path.

32. The apparatus of claim 29, wherein the processor is further configured to receive, through the network interface, a call set up message from the serving base station, the call set up message including a designation of a conference feature.

33. The apparatus of claim 30, wherein the processor is further configured to receive, through the network interface, an information messages from the serving base station designating a directory number of a terminal of the target base station in a first field and designating a conference feature in a second field.

34. The apparatus of claim 29, wherein the processor includes further instructions upon reception, via the network interface, of a disconnect message from the serving base station, to transmit a release message to the serving base station.

35. The apparatus of claim 29, wherein the apparatus is included within a switch.

36. A serving base station for hand-off of a communication session, in which the communication session of a mobile unit on a first call path is transferred from the serving base station to a target base station via a switch, the serving base station comprising:
- a network interface for communication with the switch, with the target base station, and with the mobile unit;
- a memory storing instructions; and
- a processor coupled to the memory and to the network interface, wherein the processor is configured to receive a designated directory number of a terminal of the target base station; to transmit to the switch, through the network interface, a call set up message and one or more information messages specifying the designated directory number for generation of a second call path to the target base station via the switch and further specifying a multiway feature directing the switch to merge the first call path and the second call path to form a multiway communication session between and among the serving base station, the switch, and the target base station; and when the mobile unit has communicated with the target base station, the processor being further configured to direct the switch to release the serving base station from the multiway communication session.

37. A switch for hand-off of a communication session utilizing multiway capabilities, in which the communication session of a mobile unit on a first call path is transferred from a serving base station to a target base station, the switch comprising:
- a network interface for communication with the serving base station and the target base station;
- a memory storing instructions; and
- a processor coupled to the memory and to the network interface, wherein the processor is configured, upon reception of a call set up message and one or more information messages from the serving base station specifying the designated directory number and further specifying a multiway feature, generating a second call path from the serving base station to the target base station and merging the first call path and the second call path to form a multiway communication session between and among the serving base station, the switch, and the target base station; and when the mobile unit has communicated with the target base station, the processor being further configured, upon reception of a disconnect request from the serving base station, to release the serving base station from the multiway communication session.

* * * * *